(12) United States Patent
Stasiak et al.

(10) Patent No.: US 8,020,939 B2
(45) Date of Patent: Sep. 20, 2011

(54) FASTENING BELT SYSTEM FOR PARTICULAR USE IN CHILD AUTOMOBILE TRANSPORT SOLUTIONS

(75) Inventors: Piotr Stasiak, Legionowo (PL); Waldemar Filutowski, Sulejówek (PL)

(73) Assignee: Ramatti SP. Z.O.O., Izabelin (PL)

( * ) Notice: Subject to any disclaimer, the term of this patent is extended or adjusted under 35 U.S.C. 154(b) by 0 days.

(21) Appl. No.: 12/312,406

(22) PCT Filed: Nov. 9, 2007

(86) PCT No.: PCT/PL2007/000076
§ 371 (c)(1), (2), (4) Date: Aug. 10, 2009

(87) PCT Pub. No.: WO2008/056999
PCT Pub. Date: May 15, 2008

(65) Prior Publication Data
US 2009/0315386 A1    Dec. 24, 2009

(30) Foreign Application Priority Data
Nov. 10, 2006  (PL) .................................. 381021

(51) Int. Cl.
*A47D 15/00* (2006.01)
*A62B 35/00* (2006.01)
*B60R 22/10* (2006.01)
(52) U.S. Cl. .......................... 297/466; 297/467; 297/484
(58) Field of Classification Search .................. 297/466, 297/467, 484
See application file for complete search history.

(56) References Cited

U.S. PATENT DOCUMENTS

| 921,812 | A | * | 5/1909 | Dorf | 297/484 X |
|---|---|---|---|---|---|
| 1,123,278 | A | * | 1/1915 | Hallett | 297/484 |
| 1,288,170 | A | * | 12/1918 | Pick | 297/484 |
| 1,697,363 | A | * | 1/1929 | Losey | 297/484 |
| 1,816,262 | A | * | 7/1931 | Ritter | 297/484 |
| 2,365,626 | A | * | 12/1944 | Carlisle | 297/484 |
| 2,794,653 | A | * | 6/1957 | Sullivan | 297/484 |
| 2,794,654 | A | * | 6/1957 | Sullivan | 297/484 |
| 3,158,399 | A | * | 11/1964 | Pragnell | 297/484 |
| 3,191,599 | A | * | 6/1965 | Kendell | 297/466 X |
| 3,513,930 | A | * | 5/1970 | Brown, Jr. | 297/484 X |
| 3,604,750 | A | * | 9/1971 | Doering | 297/467 |
| 3,612,605 | A | * | 10/1971 | Posey, Jr. | 297/484 |
| 3,832,002 | A | * | 8/1974 | Eggert et al. | 297/484 X |

(Continued)

FOREIGN PATENT DOCUMENTS

EP            295838            12/1988

(Continued)

*Primary Examiner* — Rodney B White
(74) *Attorney, Agent, or Firm* — Rabin & Berdo, PC

(57) ABSTRACT

A fastening belt system designed for use in child automobile transport solutions, and in particular, in child car seats is provided. The fastening belt system is characterized by its use of at least one belt and five anchor points potentially equipped with openings and buckles, which create a harness system composed of the right breast strap and the left breast strap that crisscross at the child's chest, while the right hip strap and the left hip strap belt in the child's legs at the hips. The right breast strap runs from the upper right anchor point to the lower left point; the left breast strap links the upper left anchor point with the lower right point; the right hip strap links the lower middle anchor point with the lower right point; the left hip strap runs from the lower middle anchor point towards the lower left point.

7 Claims, 5 Drawing Sheets

U.S. PATENT DOCUMENTS

Figure 1:
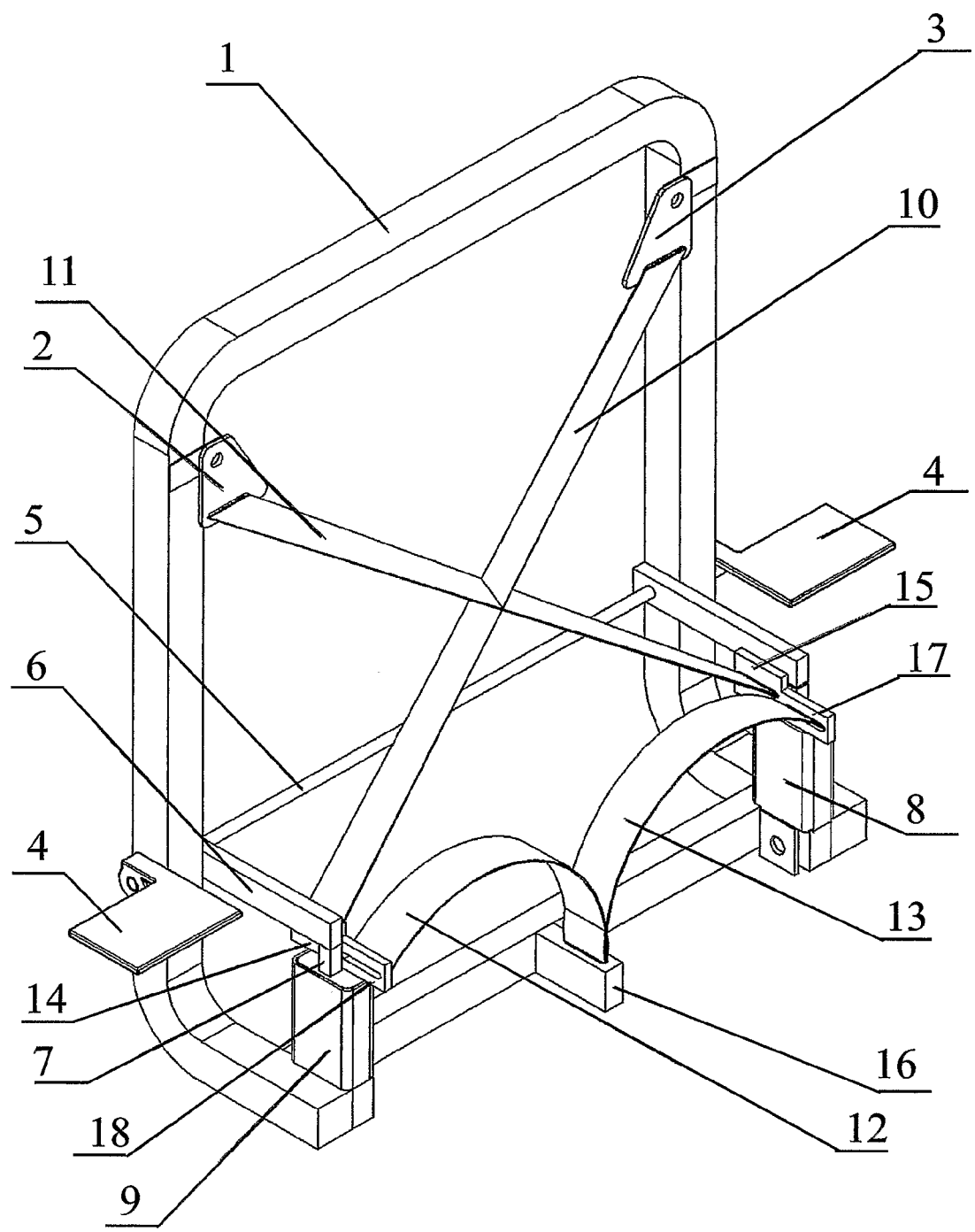

| | | | |
|---|---|---|---|
| 4,047,755 A * | 9/1977 | McDonald et al. | 297/484 X |
| 4,488,691 A | 12/1984 | Lorch | |
| 4,540,218 A * | 9/1985 | Thomas | 297/467 |
| 4,738,413 A * | 4/1988 | Spinosa et al. | 297/467 X |
| 4,874,203 A * | 10/1989 | Henley | 297/464 X |
| 5,123,673 A * | 6/1992 | Tame | 297/484 X |
| 5,135,075 A * | 8/1992 | Aten et al. | 297/484 X |
| 5,156,436 A * | 10/1992 | Grene | 297/466 |
| 5,203,613 A * | 4/1993 | Ward | 297/467 X |
| 5,215,354 A * | 6/1993 | Grene | 297/466 X |
| 5,259,338 A * | 11/1993 | Cornell | 297/484 X |
| 5,301,903 A * | 4/1994 | Aronne | 297/466 X |
| 5,352,024 A * | 10/1994 | Grene | 297/466 X |
| 5,397,171 A * | 3/1995 | Leach | 297/484 |
| 5,524,928 A * | 6/1996 | Monagas | 297/484 X |
| 5,641,200 A * | 6/1997 | Howell | 297/484 X |
| 5,649,744 A * | 7/1997 | Apodaca | 297/484 X |
| 6,109,698 A * | 8/2000 | Perez | 297/484 |
| 6,364,417 B1 * | 4/2002 | Silverman | 297/467 X |
| 6,409,243 B1 * | 6/2002 | Hansen | 297/484 |
| 6,467,851 B1 * | 10/2002 | Mannell et al. | 297/484 |
| 6,758,520 B2 * | 7/2004 | Pehrson | 297/484 X |
| 6,811,186 B1 * | 11/2004 | Fraley et al. | 297/484 X |
| 7,131,668 B2 * | 11/2006 | Go | 297/467 X |
| 7,364,199 B2 * | 4/2008 | Elizondo et al. | 297/484 X |
| 7,770,969 B2 * | 8/2010 | Boyle et al. | 297/484 X |
| 7,775,557 B2 * | 8/2010 | Bostrom et al. | 297/484 X |
| 7,891,741 B2 * | 2/2011 | Lienr, Jr. | 297/466 X |
| 2002/0070593 A1 | 6/2002 | Takayama | |
| 2007/0246927 A1 * | 10/2007 | Okada | 297/484 X |

FOREIGN PATENT DOCUMENTS

| | | | | |
|---|---|---|---|---|
| JP | | 61282145 A * | 12/1986 | 297/466 |

* cited by examiner

FASTENING BELT SYSTEM FOR PARTICULAR USE IN CHILD AUTOMOBILE TRANSPORT SOLUTIONS

This invention in question is a fastening belt system designed for use in child automobile transport solutions, and in particular, in child car seats.

A large amount of popular and frequently used child car seats use three-strap harness systems, where the first strap is connected to the upper left and lower left anchor point and the second one—to the upper right and lower right anchor point. Both straps end in clasps, while the third strap (hip strap) is connected to the middle anchor point and ends in a belt buckle. For correct strap arrangement, the clasps of the first two straps must be closed at the belt buckle of the third strap. To unblock the harness, a special button must be pressed to release the clasps of both straps. Most popular child car seats have belt buckles at the level of the child's stomach, risking perineum and stomach injuries in case of accident.

Patent document no. EP 0295838A introduces a fastening belt system designed for use in child automobile transport solutions, which makes use of at least one belt and five anchor points equipped with openings and buckles, and which create a harness system composed of the right breast strap and the left breast strap, the right hip strap and the left hip strap.

The fastening belt system designed for use in child automobile transport solutions makes use of at least one belt and five anchor points equipped with openings and buckles, and which create a harness system composed of the right breast strap and the left breast strap, the right hip strap and the left hip strap, i.e. the Invention, is characterized by its construction, where the right breast strap and the left breast strap crisscross at the child's chest, while the right hip strap and the left hip strap belt in the child's legs at the hips, and wherein the right breast strap runs from the upper right anchor point to the lower left point, the left breast strap links the upper left anchor point with the lower right point, the right hip strap links the lower middle anchor point with the lower right point, and the left hip strap runs from the lower middle anchor point towards the lower left point.

The fastening belt system, i.e. the Invention, is characterized by its construction, where four separate belts create a harness system with the right breast strap permanently affixed to the upper right anchor point, linking the upper right point with the lower left point, which is equipped with a buckle for the clasp of the right breast strap. The left breast strap is permanently affixed to the upper left anchor point, linking the upper left point with the lower right point, which is equipped with a buckle for the clasp of the left breast strap. The right hip strap is permanently affixed to the lower middle anchor point, linking the lower middle point with the lower right point, which is equipped with a buckle for the clasp of the right hip strap, while the left hip strap is permanently affixed to the lower middle anchor point, linking the lower middle point with the lower left point, which is equipped with a buckle for the clasp of the left hip strap.

The fastening belt system in this variation of the Invention is characterized by its construction, where one belt creates a four-strap harness system with the left hip strap connecting the lower middle anchor point, which is equipped with a buckle for the clasp of the left hip strap, with the lower left point, which features an opening for threading the left hip strap and connecting it, as the right breast strap, to the upper right anchor point with an opening for threading the right breast strap and running it horizontally to the upper left anchor point, also equipped with an opening for threading the strap and running it, as the left breast strap, to the lower right anchor point with an opening for threading the left breast strap and running it, as the right hip strap, to the lower middle anchor point with a buckle for the clasp of the right hip strap.

The fastening belt system in this variation of the Invention is characterized by its construction, where one belt creates a four-strap harness system with the left hip strap connecting the lower left anchor point, which is equipped with a buckle for the clasp of the left hip strap, with the lower middle point, which features an opening for threading the left hip strap and connecting it, as the right hip strap, to the lower right anchor point with an opening for threading the right hip strap and connecting it, as the left breast strap, to the upper left anchor point, also equipped with an opening for threading the left breast strap and running it horizontally to the upper right anchor point with an opening for threading the left breast strap and running it, as the right breast strap, to the lower left anchor point with a buckle for the clasp of the right breast strap.

The fastening belt system in this variation of the invention is characterized by its construction, where two belts create a four-strap harness system with the left breast strap and the right hip strap are permanently affixed to the lower right anchor point. The left breast strap connects the lower right anchor point with the upper left point with an opening for threading the left breast strap and running it horizontally to the upper right anchor point with an opening for threading the strap and running it, as the right breast strap, to the lower left anchor point equipped with a buckle for the clasp of the right breast strap. The right hip strap links the lower right anchor point with the lower middle point with an opening for threading the right hip strap and running it, as the left hip strap, to the lower left anchor point equipped with a buckle for the clasp of the left hip strap.

The fastening belt system in this variation of the Invention is characterized by its construction, where two belts create a four-strap harness system with the right breast strap connecting the upper right anchor point with the lower left point with a handle for looping the right breast strap and connecting it, as the left hip strap, with the lower middle anchor point equipped with a buckle for the clasp of the left hip strap. The left breast strap links the upper left anchor point with the lower right point with a handle for looping the left breast strap and connecting it, as the right hip strap, with the lower middle anchor point equipped with a buckle for the clasp of the right hip strap.

Each variation of the fastening belt system for use in child car seats, i.e. the Invention, features a system of four straps, two of which cross at the chest, while the two others girdle the child's legs at the hips level, ensuring children safety during car travel. The crisscross breast strap arrangement ensures that during an accident, any forces exerted on the child will be distributed evenly on its chest. The hip straps belting in the child's legs at the hip level, restrain the hips in case of accident, preventing any injuries to the stomach or the genitalia. The belt buckles applied in the invention ensure simultaneous blocking of separate strap clasps in one buckle.

Figure 2:
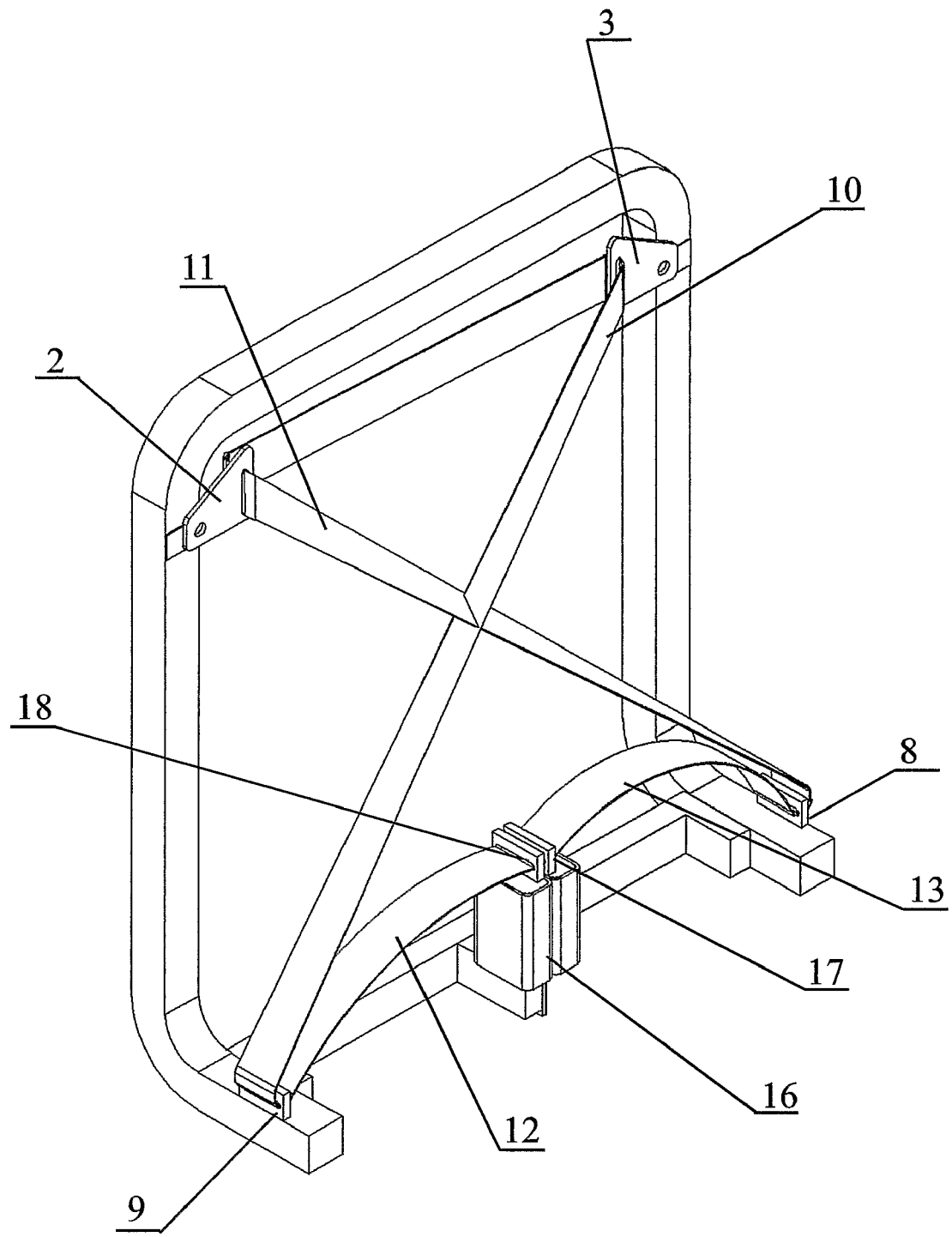
Figure 3:
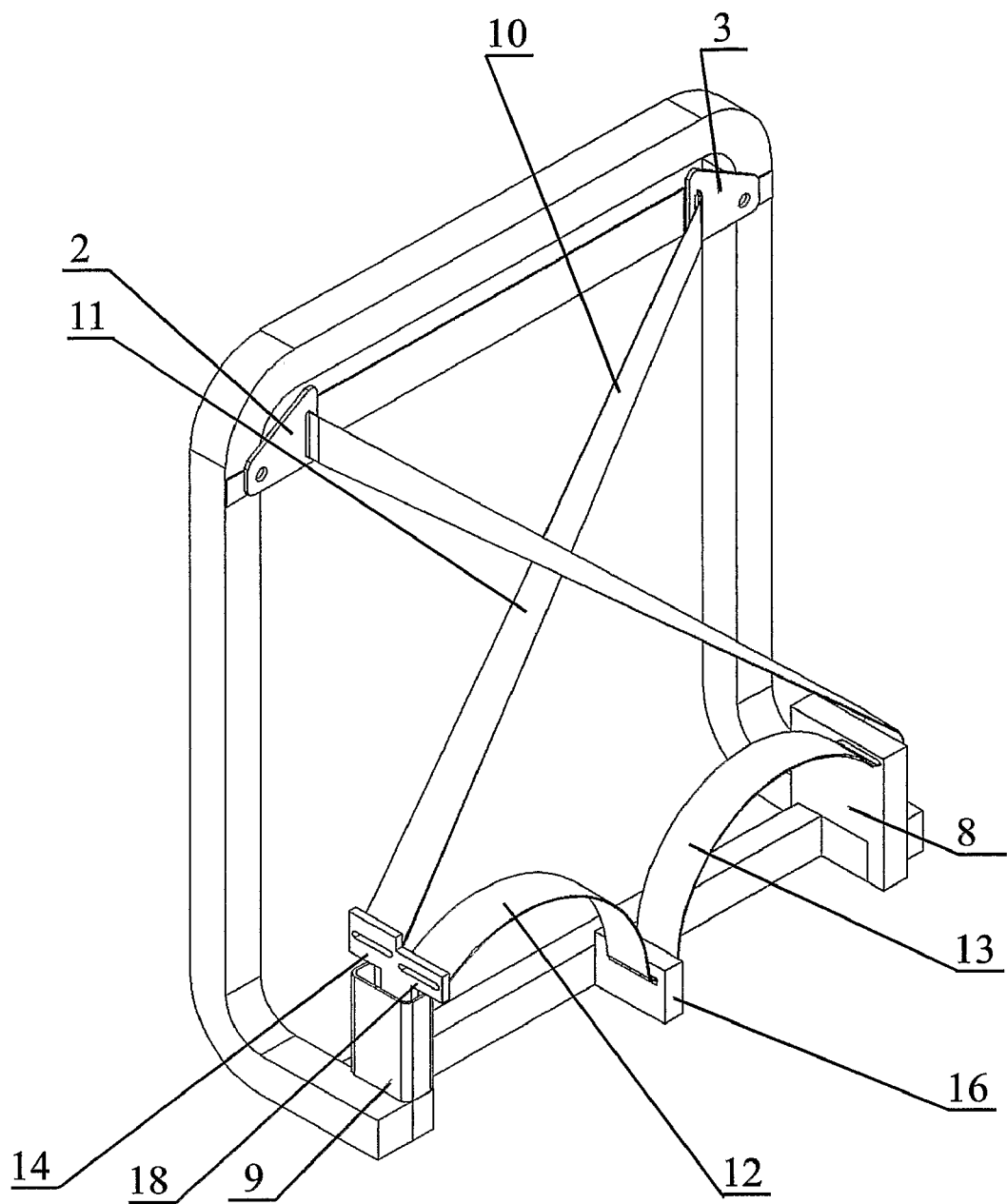
Figure 4:
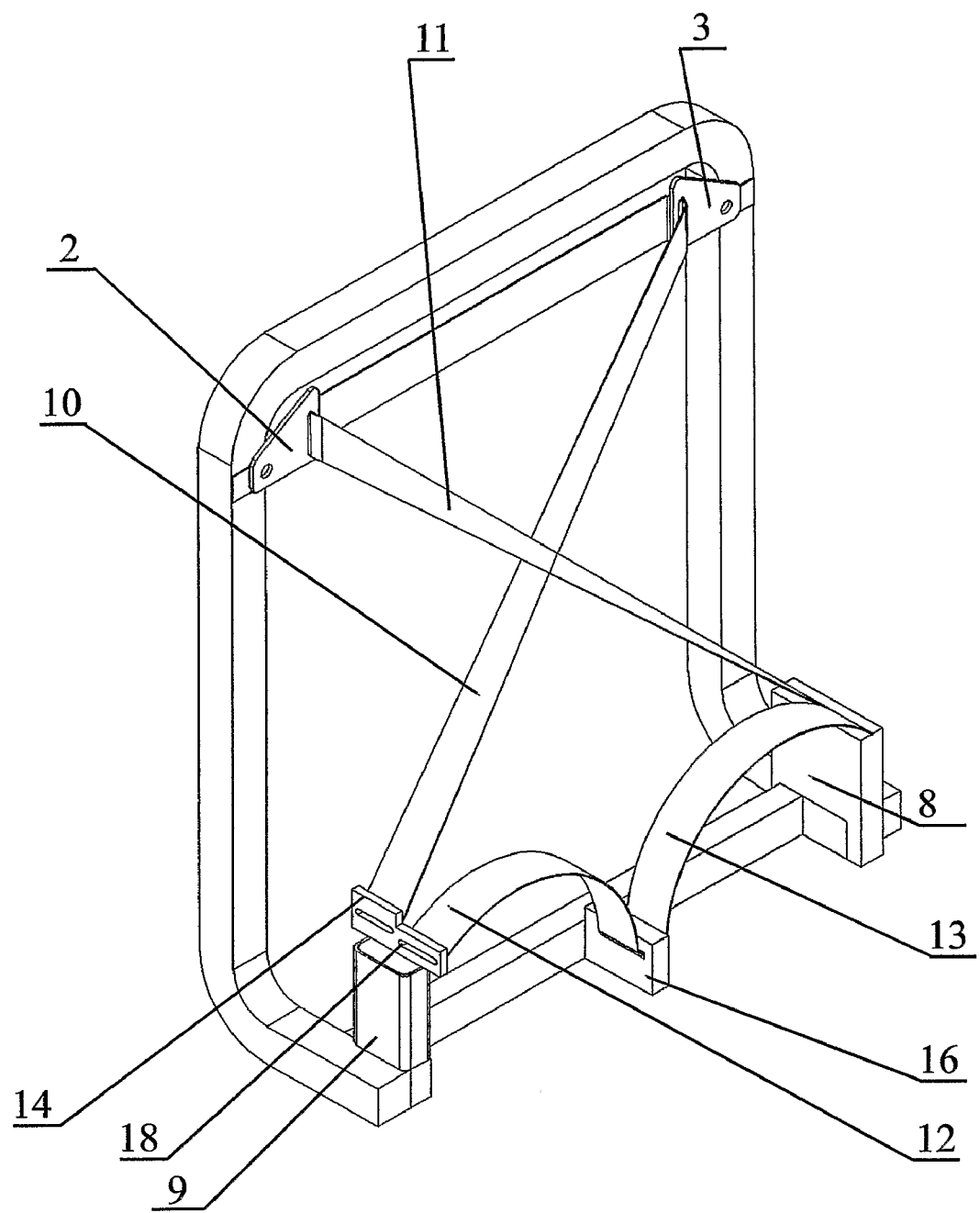
Figure 5:
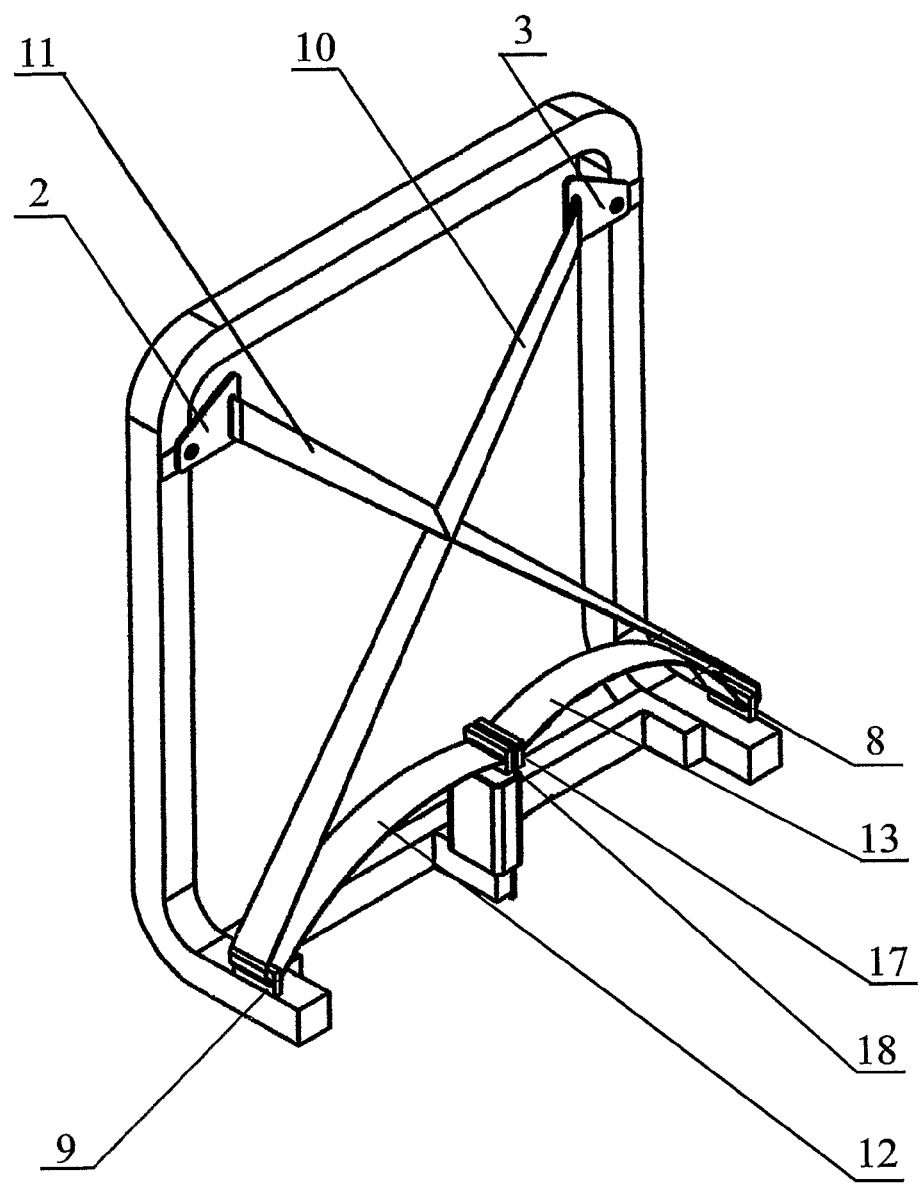

The invention is presented in illustrations, in the following variants:

FIG. 1 presents a four-belt harness system,
FIG. 2—a variation of the one-belt harness system,
FIG. 3—a variation of the one-belt harness system,
FIG. 4—a variation of the two-belt harness system,
FIG. 5—a variation of the two-belt harness system.

The fastening belt system, i.e. the Invention, is composed of: the body 1 with the upper left anchor point 2 for the left breast strap 11, the upper right anchor point 3 for the right breast strap 10, the lower right anchor point 8 for the left breast strap 11 and the right hip strap 13, the lower left anchor point 9 for the right breast strap 10 and the left hip strap 12, the lower middle anchor point 16 for the left hip strap 12 and the right hip strap 13, the lever 4, the axle 5, the brace 6 and the pusher 7. Anchor points 8, 9, 16 are equipped with belt buckles for fastening clasps 14, 15, 17, 18 and straps 10, 11, 12, 13, and are released by turning the left or right lever 4, turning the axle 5, turning the brace 6 or the pusher 7, controlling the release buttons.

The fastening belt system, i.e. the Invention represented in FIG. 1, is composed of four separate belts creating a harness system, where the right breast strap 10 and the left breast strap 11 crisscross at the child's chest, while the right hip strap 13 and the left hip strap 12 belt in the child's legs at the hips. The right breast strap 10 is affixed to the upper right anchor point 3, linking the upper right point 3 with the lower left point 9, which is equipped with a buckle for the clasp 14 of the right breast strap 10, while the left breast strap 11 is affixed to the upper left anchor point 2, linking the upper left point with the lower right point 8, which is equipped with a buckle for the clasp 15 of the left breast strap 11. The right hip strap 13 is affixed to the lower middle anchor point 16, linking the lower middle point 16 with the lower right point 8, which is equipped with a buckle for the clasp 17 of the right hip strap 13, while the left hip strap 12 is affixed to the lower middle anchor point 16, linking the lower middle point 16 with the lower left point 9, which is equipped with a buckle for the clasp 18 of the left hip strap 12.

The fastening belt system, i.e. the Invention represented in FIG. 2, is composed of one belt creating a four-strap harness system, where the right breast strap 10 and the left breast strap 11 crisscross at the child's chest, while the right hip strap 13 and the left hip strap 12 belt in the child's legs at the hips. The left hip strap 12 is affixed to the lower middle anchor point 16, linking the lower middle point 16, which is equipped with a buckle for the clasp 18 of the left hip strap 12, with the lower left point 9, threading the left hip strap through an opening in the lower left point 9 and, as the right breast strap 10, connecting the strap to the upper right anchor point 3, then threading the right breast strap 10 through an opening in the upper right point 3 and running it horizontally to the upper left anchor point 2. The strap is then threaded through the opening in the upper left anchor point 2 and, as the left breast strap 11, it runs towards the lower right point 8, where it is threaded through an opening in lower right point 8 and run, as the right hip strap 13, towards the lower middle anchor point 16, which is equipped with a belt buckle for the clasp 17 of the right hip strap 13.

The fastening belt system, i.e. the Invention represented in FIG. 3, is composed of one belt creating a four-strap harness system, where the right breast strap 10 and the left breast strap 11 crisscross at the child's chest, while the right hip strap 13 and the left hip strap 12 belt in the child's legs at the hips. The left hip strap 12 is affixed to the lower middle anchor point 16, linking the lower left point 9, which is equipped with a buckle for the clasp 18 of the left hip strap 12, with the lower middle point 16, threading the left hip strap through an opening in the lower middle point 16 and, as the right hip strap 13, connecting the strap to the lower right anchor point 8, then threading the right hip strap 13 through an opening in the lower right point 8 and running it towards the upper left anchor point 2 as the left breast strap 11. The left breast strap 11 is threaded through an opening in the upper left anchor point 2 and run horizontally towards the upper right anchor point 3, then threaded through an opening in the upper right point 3 and, as the right breast strap 10, run towards the lower left anchor point 9, which is equipped with a belt buckle for the clasp 14 of the right breast strap 10.

The fastening belt system, i.e. the Invention represented in FIG. 4, is composed of two belts creating a four-strap harness system, where the right breast strap 10 and the left breast strap 11 crisscross at the child's chest, while the right hip strap 13 and the left hip strap 12 belt in the child's legs at the hips, and where the left breast strap 11 and the right hip strap 13 are permanently affixed to the lower right anchor point 8. The left breast strap 11 connects the lower right anchor point 8 with the upper left point 2 with an opening for threading the left breast strap 11 and running it horizontally to the upper right anchor point 3 with an opening for threading the strap and running it, as the right breast strap 10, to the lower left anchor point 9 equipped with a buckle for the clasp 14 of the right breast strap 10. The right hip strap 13 links the lower right anchor point 8 with the lower middle point 16 with an opening for threading the right hip strap 13 and running it, as the left hip strap 12, to the lower left anchor point 9 equipped with a buckle for the clasp 18 of the left hip strap 12.

The fastening belt system, i.e. the Invention represented in FIG. 5, is composed of two belts creating a four-strap harness system, where the right breast strap 10 and the left breast strap 11 crisscross at the child's chest, while the right hip strap 13 and the left hip strap 12 belt in the child's legs at the hips. The right breast strap 10 runs from the upper right anchor point 3 towards the lower left point 2 with a handle for looping the right breast strap 10 and connecting it, as the left hip strap 12, with the lower middle anchor point 16 equipped with a buckle for the clasp 18 of the left hip strap 12. The left breast strap 11 runs from the upper left anchor point 2 towards the lower right point 3 with a handle for looping the left breast strap 11 and connecting it, as the right hip strap 13, with the lower middle anchor point 16 equipped with a buckle for the clasp 17 of the right hip strap 13.

The invention claimed is:

1. A fastening belt system for use in child automobile transport solutions and that creates a harness system, the fastening belt system comprising:
    an upper right anchor point;
    an upper left anchor point;
    a lower left anchor point;
    a lower right anchor point;
    a lower middle anchor point;
    a left breast strap;
    a right hip strap; and
    a left hip strap,
    the right breast strap and the left breast strap crisscross at a child's chest, while the right hip strap and the left hip strap girdle the child's legs at a hip level of the child to belt in the child, and
    the right breast strap links the upper right anchor point with the lower left anchor point, the left breast strap links the upper left anchor point with the lower right anchor point, the right hip strap links the lower middle anchor point with the lower right anchor point, the left hip strap links the lower middle anchor point with the lower left anchor point,
    wherein each anchor point has either a strap affixed thereto, is equipped with an opening to allow for threading of a strap therethrough, or is equipped with a buckle for clasping a clasp.

2. The fastening belt system according to claim 1, wherein the left breast strap, the right hip strap, the left hip strap and the right breast strap are each separate and non-contiguous belts, where the right breast strap is permanently affixed to the upper right anchor point and links the upper right anchor point with the lower left anchor point, which is equipped with a belt buckle for a clasp of the right breast strap, while the left breast strap is permanently affixed to the upper left anchor point and links the upper left anchor point with the lower right anchor point, which is equipped with a belt buckle for a clasp of the left breast strap, the right hip strap is permanently affixed to the lower middle anchor point and links the lower middle anchor point with the lower right anchor point, which is equipped with a belt buckle for a clasp of the right hip strap, while the left hip strap is permanently affixed to the lower middle anchor point and links the lower anchor middle point with the lower left anchor point, which is equipped with a belt buckle for a clasp of the left hip strap.

3. The fastening belt system according to claim 1, wherein the left breast strap, the right hip strap, the left hip strap, the right breast strap are a contiguous belt, where the left hip strap links the lower middle anchor point, which is equipped with a belt buckle for a clasp of the left hip strap, with the lower left anchor point that includes an opening for threading the left hip strap as the right breast strap, linking with the upper right anchor point with an opening for threading the right breast strap and horizontally linking the belt with the upper left anchor point with an opening for threading the left breast strap and linking the left breast strap with the lower right anchor point with an opening for threading the left breast strap and as the right hip strap linking with the lower middle anchor point, which is equipped with a belt buckle for a clasp of the right hip strap.

4. The fastening belt system according to claim 1, wherein the left breast strap, the right hip strap, the left hip strap, the right breast strap are a contiguous belt, where the left hip strap links the lower left anchor point, which is equipped with a belt buckle for a clasp of the left hip strap, with the lower middle anchor point with an opening for threading the left hip strap and, as the right hip strap, linking with the lower right anchor point with an opening for threading the right hip strap and, as the left breast strap, linking with the upper left anchor point with an opening for threading the left breast strap and linking the belt with the upper right anchor point with an opening for threading the strap and as the right breast strap, linking with the lower left anchor point which is equipped with a belt buckle for a clasp of the right breast strap.

5. The fastening belt system according to claim 1, wherein the left breast strap and the right breast strap are a first contiguous belt and the right hip strap and the left hip strap are a second contiguous belt, where the left breast strap and the right hip strap are permanently affixed to the lower right anchor point, with the left breast strap linking the lower right anchor point to the upper left anchor point with an opening for threading the left breast strap and linking the first belt horizontally towards the upper right point with an opening for threading the right breast strap and as the right breast strap, linking with the lower left anchor point which is equipped with a belt buckle for a clasp of the right breast strap, the right hip strap linking the lower right anchor point with the lower middle anchor point with an opening for threading the right hip strap, as the left hip strap linking with the lower left anchor point which is equipped with a belt buckle for a clasp of the left hip strap.

6. The fastening belt system according to claim 1, wherein the left breast strap and the right hip strap are a first contiguous belt and the right breast strap and the left hip strap are a second contiguous belt, where the right breast strap links the upper right anchor point with the lower left anchor point with a handle for looping the right breast strap and, as the left hip strap, linking with the lower middle anchor point, which is equipped with a belt buckle for a clasp of the left hip strap, the left breast strap linking the upper left anchor point to the lower right anchor point with a handle for looping the left breast strap and, as the right hip strap linking with the lower middle anchor point, which is equipped with a belt buckle for a clasp of the right hip strap.

7. The fastening belt system according to claim 1, wherein the system further comprises a body and each anchor point is positioned on the body.

\* \* \* \* \*